United States Patent [19]

Noss et al.

[11] Patent Number: 5,271,521
[45] Date of Patent: Dec. 21, 1993

[54] METHOD AND APPARATUS FOR COMPENSATING FOR CHANGES IN VISCOSITY IN A TWO-COMPONENT DISPENSING SYSTEM

[75] Inventors: Jeffrey S. Noss, Bay Village; Richard P. Price, Parma Heights; James W. Schmitkons, Lorain, all of Ohio

[73] Assignee: Nordson Corporation, Westlake, Ohio

[21] Appl. No.: 980,543

[22] Filed: Nov. 23, 1992

Related U.S. Application Data

[63] Continuation-in-part of Ser. No. 943,105, Sep. 10, 1992, which is a continuation of Ser. No. 640,060, Jan. 11, 1991, abandoned, and a continuation-in-part of Ser. No. 640,043, Jan. 11, 1991.

[51] Int. Cl.$^5$ .......................................... B67D 5/52
[52] U.S. Cl. .................................. 222/1; 222/135; 222/145; 222/146.2; 222/55; 222/63
[58] Field of Search ................. 222/135, 145, 129, 63, 222/55, 54, 52, 146.2, 146.5, 1

[56] References Cited

U.S. PATENT DOCUMENTS

| | | |
|---|---|---|
| 4,493,286 | 1/1985 | Carson .................... 222/135 X |
| 4,548,652 | 10/1985 | Kelly et al. . |
| 5,162,121 | 11/1992 | Kawaguchi et al. . |

FOREIGN PATENT DOCUMENTS

| | | |
|---|---|---|
| 0025871 | 4/1981 | European Pat. Off. . |
| 0223519 | 5/1987 | European Pat. Off. . |
| 0374300 | 6/1990 | European Pat. Off. . |
| 0473424 | 3/1992 | European Pat. Off. . |
| 91/10551 | 7/1991 | PCT Int'l Appl. . |
| 2163360 | 2/1986 | United Kingdom . |

OTHER PUBLICATIONS

369 Plastics Engineering: pp. 33-35, Machinery, Nov. 1983: "Exacting RIM process controls help yield higher-quality plastic parts".

*Primary Examiner*—David H. Bollinger
*Attorney, Agent, or Firm*—Wood, Herron & Evans

[57] ABSTRACT

A two-component mixing and dispensing system for mixing and dispensing two-component polymeric materials which react chemically with one another when combined to form a mixture includes a controller for adjusting the pressure at which at least one of the components is supplied to a dispenser dependent upon variations in the parameters which affect the cure time of the mixture.

17 Claims, 3 Drawing Sheets

METHOD AND APPARATUS FOR COMPENSATING FOR CHANGES IN VISCOSITY IN A TWO-COMPONENT DISPENSING SYSTEM

This is a continuation-in-part application of copending U.S. patent application Ser. No. 07/943,105 to Schmitkons et al, filed Sep. 10, 1992 and entitled "Method and Apparatus For Metering Flow of A Two-Component Dispensing System", which is a continuation of U.S. patent application Ser. No. 07/640,060 to Schmitkons et al, filed Jan. 11, 1991, now abandoned; and a continuation in-part application of copending U.S. patent application No. 07/640,043 to Schmitkons, et al, filed Jan. 11, 1991 and entitled "Method and Apparatus For Cleaning A Mixer", the disclosure of each is hereby incorporated by reference herein, and all of which are owned by the assignee of this invention.

FIELD OF THE INVENTION

This invention relates to two-component mixing and dispensing systems and, more particularly, to systems for mixing and dispensing two different polymeric materials which react chemically with one another when combined to form a mixture whose viscosity varies with changes in operating parameters such as temperature, cure time and the ratio of such materials.

BACKGROUND OF THE INVENTION

Two-component polymeric materials such as reactive adhesives, paints, gasket materials, and caulking materials comprise two separate components which react chemically with one another when intermixed. For example, two-component hot melt polymeric materials used in adhesive applications include a polymeric material and a second material such as a hardener. These types of hot melt adhesives, and other two-component polymeric materials, are dispensed from a system in which the two components are supplied in a predetermined ratio from separate metering pumps to a mixer/dispenser where they are intermixed with one another and dispensed onto a substrate. In such a system, if too much of one component is applied, then the characteristics of the combined mixture of such materials are undesirably altered. It is therefore important that the ratio of the components of two-component mixing and dispensing systems be exactly maintained. But this ratio is particularly difficult to maintain when the materials are supplied to a mixer/dispenser which is intermittent in operation, i.e., which is repeatedly turned on and off. In such applications, loss of ratio control characteristically occurs for a few seconds shortly after the dispenser valve is opened during which time a transient imbalance phenomena occurs caused by the elasticity in the system and the changing hydraulic pressures associated with cycling the mixer/dispenser.

Another problem which may occur in intermittent operation of two-component mixing and dispensing systems is a loss of flow control of the resulting mixture of the two components. It is desirous to control the flow rate of the resulting mixture dispensed to the substrate. However, during the first few seconds after opening of the mixer/dispenser, the transient imbalance phenomena described above may result in a loss of control of the flow rate of the mixture. Additionally, a loss of precise control of the flow rate of the mixture can occur as a result of changes in density or viscosity of either of the two components due to temperature changes thereof. If the mixture is an adhesive, this may result in less adhesive being applied to the substrate, which, in turn, may affect the bonding of materials.

The aforementioned problems with two-component mixing and dispensing systems have been addressed in U.S. patent application Ser. No. 07/640,060. As disclosed in that application, the exact ratio of the two components supplied to the mixer/dispenser can be controlled as a function of the pressure of the two materials at the inlets to the mixer/dispenser. It was recognized that maintenance of the desired ratio of such components requires adjustment and control of the pressure of each component at the mixer/dispenser during the off cycle of the operation. In order to achieve such control, the system of application Ser. No. 07/640,060 includes two back pressure controls, each of which is interposed between the intermittently operable mixer/dispenser and a metering gear pump connected to a source of one of the components of liquid material. Each back pressure control comprises a bypass flow path around each metering pump and an adjustable pressure regulator contained in that bypass path. Additionally, each bypass flow path includes a flow control valve which is closed when the dispenser flow control valve is open and vice versa. To control the pressure of each component at their respective inlets to the dispenser, the adjustable pressure regulator in each bypass flow path is operated either manually or automatically to adjust the pressure at the inlets to the mixer/dispenser when the flow control valve is closed so that such pressure is equal to or a function of the steady state flow pressure at the inlet to the mixer/dispenser when its valve is open.

Despite the above-mentioned improvements in the control system associated with two-component mixing and dispensing systems disclosed in U.S. patent application Ser. No. 07/640,060, additional problems have been discovered with intermittent operations of systems of this type. As described above, the two components are supplied separately from individual sources into the mixer/dispenser where they are combined with one another to form a mixture prior to deposition onto a substrate. Within a short period of time, these intermixed materials begin to cure within the mixer/dispenser which can appreciably increase the viscosity of the mixture and/or create problems of plugging or clogging of the mixer/dispenser with cured material. Depending upon the period of time during which the mixer/dispenser is shut off, and other parameters such as temperature of the components and the ratio at which such components are supplied to the mixer/dispenser, a pressure substantially in excess of the steady state pressure may be required to obtain the desired volumetric or mass flow rate of each component, and therefore the ratio and the total flow rate of the mixture from the mixer/dispenser when its valve is again opened and flow is resumed.

SUMMARY OF THE INVENTION

It is therefore among the objectives of this invention to provide a method and apparatus for mixing and dispensing two different polymeric materials which react chemically with one another when combined to form a mixture, which accounts for changes in viscosity of the mixture resulting from factors which affect the cure rate of the mixture, and which ensures that the volumetric or mass flow rate of each component, and therefore the ratio and the total flow rate of the mixture emitted from the apparatus remains substantially constant, particularly during intermittent operation of the system.

These objectives are accomplished in a two-component mixing and dispensing system of the type disclosed in the above-mentioned U.S. patent application Ser. No. 07/640,060, the disclosure of which is incorporated by reference in its entirety herein, with the addition of structure for adjusting the pressure at which one or both of the components are supplied to the mixer/dispenser dependent on (1) the length of time during which operation of the mixer/dispenser has been terminated, (2) temperature changes of the mixture and, (3) the ratio at which the two components are supplied to the mixer/dispenser. In the event the pressure required to resume the desired flow rate of mixture from the mixer/dispenser exceeds a predetermined level, the control system of this invention is effective to initiate a purge cycle to either clean cured mixture from the mixer/dispenser, or require replacement of the mixer/dispenser, prior to resumption of the dispensing operation.

As disclosed in application Ser. No. 07/640,060, the system therein comprises a pair of metering gear pumps each having an input side connected to a source of one of the two components and an output side connected to an inlet of a mixer/dispenser. During steady state conditions, the two metering gear pumps supply a predetermined ratio of the two components into the mixer/dispenser at steady state pressure and steady state flow wherein the components are intermixed to form a mixture for deposition onto a substrate. In order to maintain a constant mass flow rate or volumetric flow rate of each component to the mixer/dispenser, particularly when the mixer/dispenser is operated intermittently, a back pressure control is associated with each metering gear pump which is effective to maintain a predetermined pressure of each component at its respective inlet to the mixer/dispenser.

This invention is predicated upon the concept of providing a further control capability in a system of the type described above. This control capability is based on the premise that higher viscosity materials require more force to move than lower viscosity materials. As the mixture of the two components within the mixer/dispenser changes in viscosity, e.g., due to increasing cure time while the dispenser remains off or increases in temperature or changes in the ratio of the two components, a change in force is required to eject the mixture from the mixer/dispenser at the same volumetric or mass flow rate obtained during steady state operation.

The control system herein is provided with inputs corresponding to each of the three system parameters which affect curing, and, hence, viscosity, of the mixture, i.e., mixer/dispenser off time, mixture temperature and the ratio of the two components. The control system includes a computer which employs an experimentally generated look-up table, or a mathematical formula, to determine the appropriate adjustment in pressure of either one of the two components supplied to the inlets of the mixer/dispenser dependent on the sensed parameters. In turn, the controller operates the pressure regulator associated with each back pressure control to vary the pressure at which one or both of the two components are supplied to the mixer/dispenser, so that when the valve of the mixer/dispenser is opened an appropriate force is applied to the mixture within the mixer/dispenser to eject it therefrom at the desired flow rate and ratio.

In the event the change in pressure required to obtain the desired flow rate exceeds operating parameters of the system, the control system is operative to initiate a purge cycle of the type disclosed in U.S. patent application Ser. No. 07/640,043, filed Jan. 11, 1991 to Schmitkons et al, entitled "Method and Apparatus For Cleaning A Mixer", which is owned by the assignee of this invention and the disclosure of which is incorporated by reference in its entirety herein. Alternatively, the control system can provide the operator with an alarm signalling he or she to replace the clogged mixer/dispenser with a new one.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
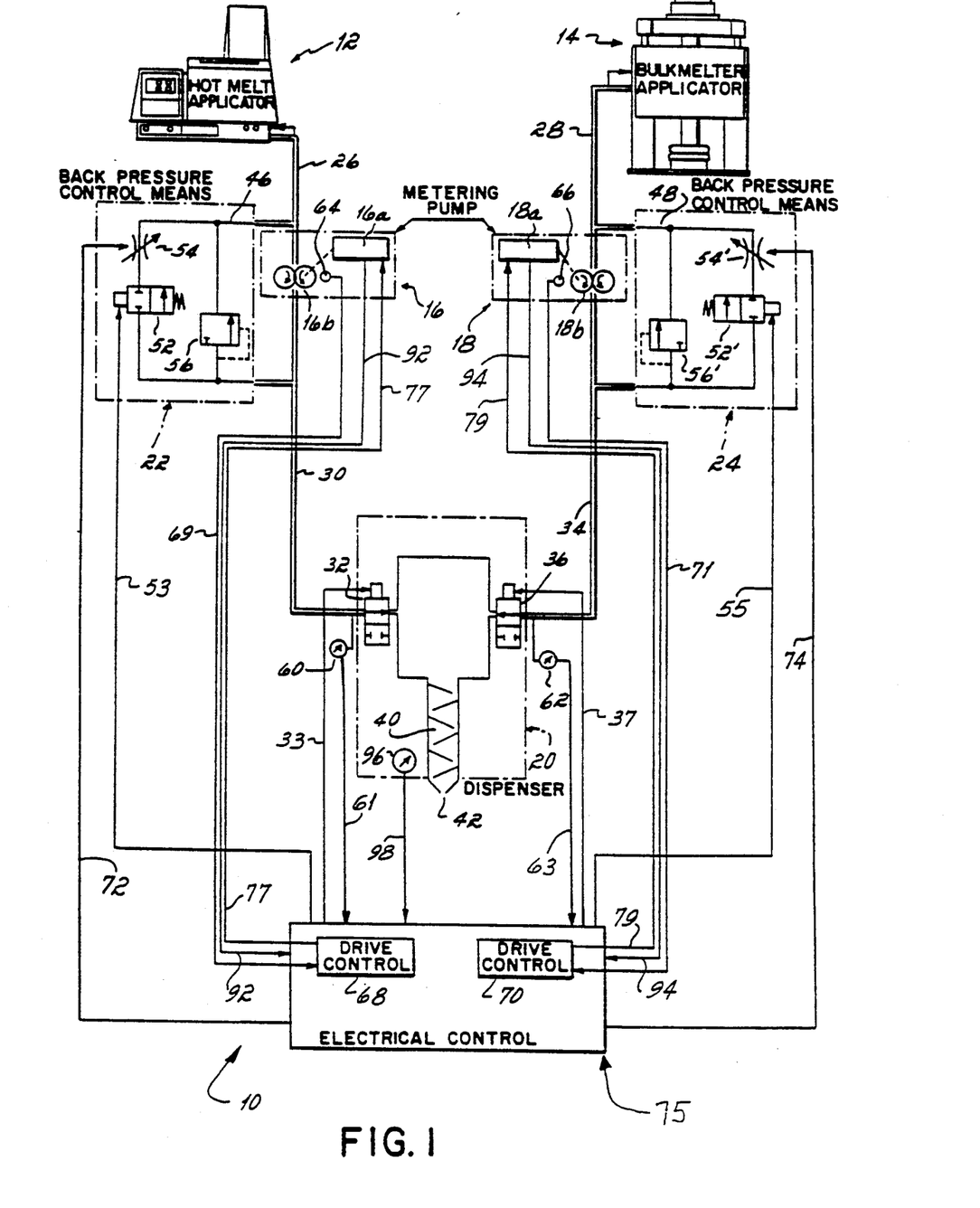
FIG. 1 is a diagrammatic illustration of a two-component mixing and dispensing system embodying the invention of this application.

The overall construction and operation of the two-component system 10 illustrated in FIG. 1 is provided initially, which, except as specifically set forth below, forms no part of this invention and is fully disclosed in U.S. patent application Ser. No. 07/640,060 mentioned above. The control system of this invention is described separately below in connection with a discussion of pressure control within system 10.

Overall System Construction

With reference to FIG. 1, there is illustrated one embodiment of a two-component system 10 for mixing and dispensing two different materials, such as two different hot melt polymeric materials. Hot melt materials are those materials which are solid at room or ambient temperature but which, upon application of heat, can be converted to the liquid state. When dispensed at ambient temperature, molten hot melt materials quickly return to the solid state. The two-component hot melt system described herein is particularly suited to the application of a two-component hot melt adhesive such as the Curemelt 560 Series two component hot melt manufactured by The Union Camp Co. This system could as well, though, be utilized for mixing and dispensing cold materials and materials other than adhesives, as for example, paints or gasket or caulking materials. Additionally, the system may be used to dispense hot melt solid or foam materials.

The two-component mixing and dispensing system 10 comprises two hot melt applicators 12 and 14, two metering pumps 16 and 18, and a mixer/dispenser 20. Additionally, there is associated with each metering pump 16 and 18 a back pressure control means 22, 24, respectively.

In this embodiment of the invention, the hot melt applicators 12 and 14 are two different types of applicators because of the different volumes of material which each is required to melt and pump to the metering pumps 16 and 18 via the interconnecting conduits 26 and 28, respectively. The hot melt applicator 12 is operative to melt and supply under pressure from a pump contained internally of the applicator a first polymeric material which is utilized in less volume than the component supplied from the bulk hot melt applicator 14. One hot melt applicator 12 suitable for melting and pumping to the system the smaller volume polymeric component of this application is completely disclosed in U.S. Pat. No. 3,964,645 issued Jun. 22, 1976 and assigned to the assignee of this application. Similarly, a bulk melter 14 suitable for melting and supplying under pressure the main or high volume polymeric component utilized in this application is completely disclosed in U.S. Pat. No. 4,073,409 issued Feb. 14, 1978.

The metering pumps 16 and 18 may be gear-type, motor-driven pumps operative to supply molten polymeric material via the conduits 26 and 28, respectively, to the dispenser 20. The volume at which each component is supplied to the dispenser 20 is controlled by the speed of the variable speed motors 16a, 18a utilized to drive the gear 16b, 18b of the pumps 16 and 18, respectively. The metering pumps 16, 18 are coupled or linked electrically such that the ratio of the volume or mass dispensed from one metering pump is in proportion to the volume or mass dispensed from the other one. From the gear pump 16, the molten polymeric material derived from the hot melt applicator 12 is supplied to the dispenser 20 via a conduit 30 through an air-operated solenoid valve 32 of the dispenser 20. Similarly, from the metering pump 18, the main or high volume polymeric material is supplied via a conduit 34 to another air-operated solenoid valve 36 of the dispenser 20. As described below, the operation of solenoid valves 32 and 36 is controlled by an electrical control 75 which is connected thereto by lines 33 and 37, respectively.

Figures 2, 3, 4, 5, 6:
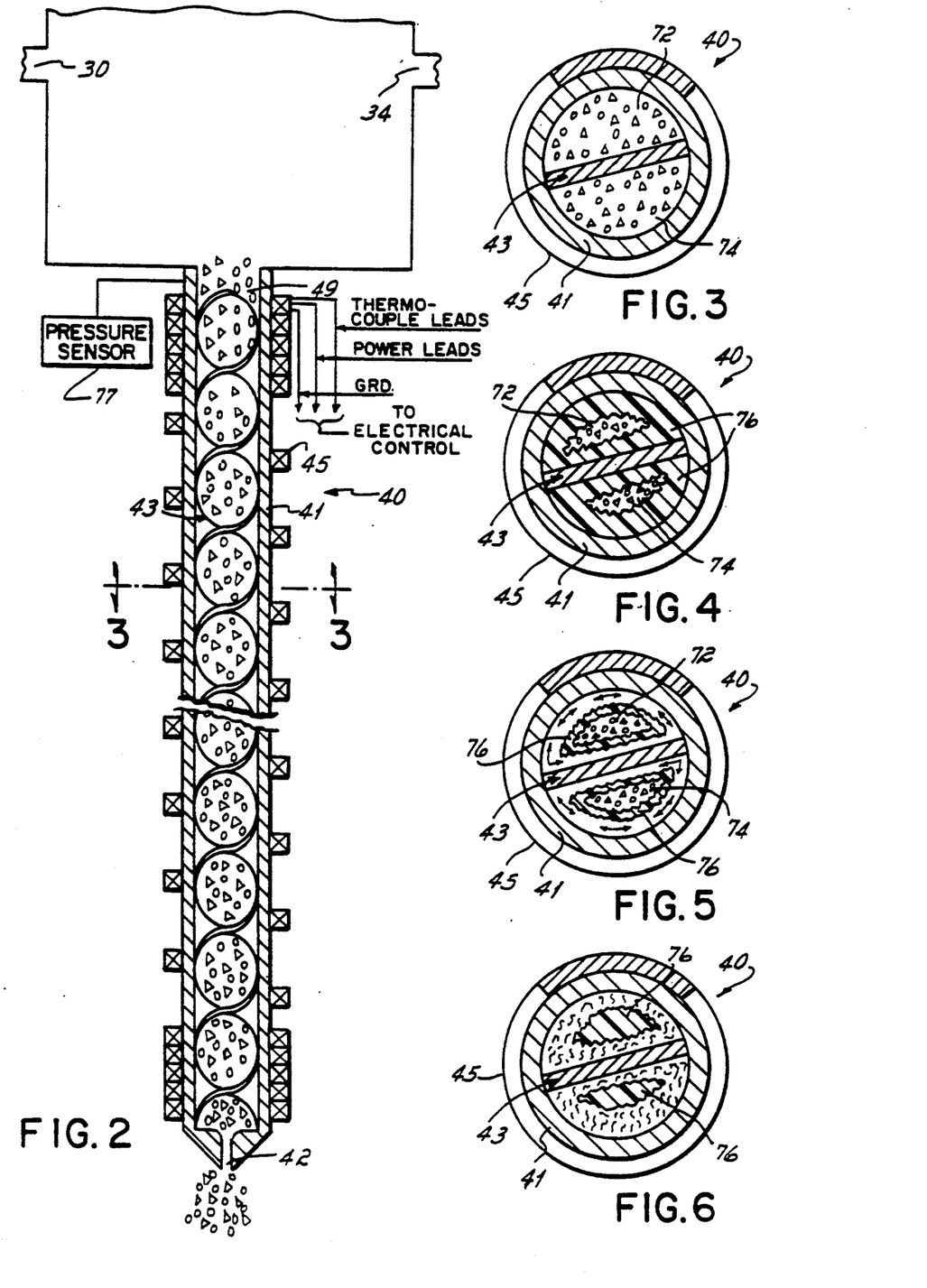
FIG. 2 is a cross sectional view of the static mixer in the system of FIG. 1.
FIG. 3 is a cross sectional view taken generally along line 3—3 of FIG. 2 illustrating the static mixer in a condition where it is completely cleared of cured material.
FIG. 4 is a view similar to FIG. 3 except after a period of operation of the mixer where a layer of cured material has collected on the mixer walls.
FIG. 5 is a view similar to FIGS. 3 and 4 except after the application to heat to the static mixer, and after the introduction of flushing material therein to dislodge the cured material.
FIG. 6 is a view similar to FIG. 5 wherein the cured material is transmitted out of the static mixer by the purging material.
Figure 7:
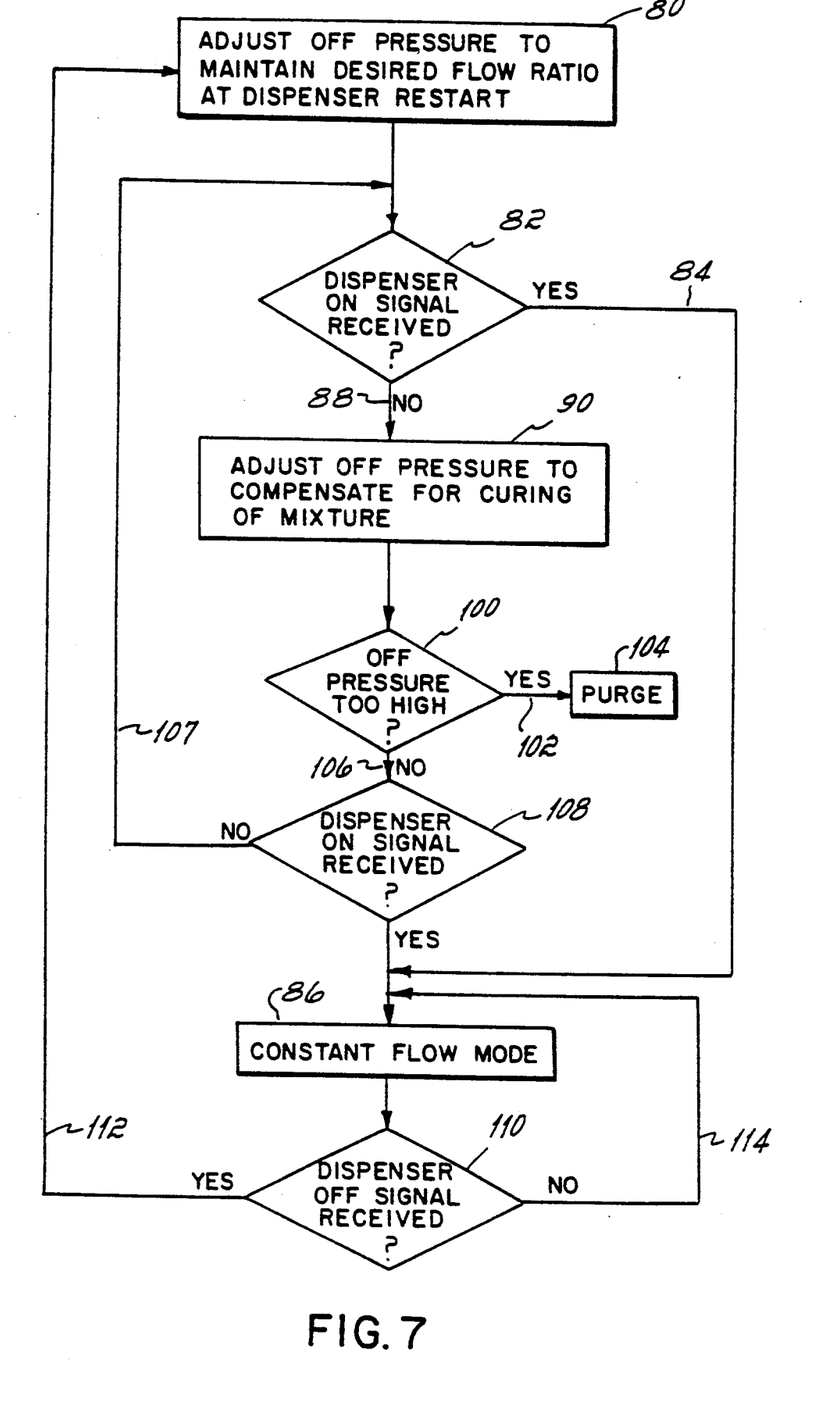
FIG. 7 is a schematic depiction in the form of a flow chart of the operation of the control system of this invention.

As shown in FIG. 2, these valves 32 and 36, in turn, are individually operable to control the flow of two different components into the dispenser 20 where the two different materials are for the first time combined. From the dispenser, the two materials flow through a static mixer 40 having an outer wall 41 and an internal mixing element 43 of the type which is operative to repeatedly divide and recombine the mixture in the course of passage through the mixer 40 such that by the time the two components reach the discharge orifice 42 of the dispenser 20, the two components have been thoroughly mixed. A static mixer is illustrated in the Figs. for purposes of describing the purging operation of this invention, but it should be understood that the method and apparatus herein is equally applicable to other types of mixers including dynamic mixers.

In one presently preferred embodiment shown in FIG. 2, an electric resistance cable heater 45 is helically wound around the outer wall 41 of mixer 40 where it is permanently brazed into position using a high melting point brazing alloy (not shown). This cable heater 45 preferably includes an internal-type thermocouple connected by a thermocouple lead to a closed-loop feedback control which forms part of the "electrical control" indicated schematically at 75 in FIG. 1. Power leads and a ground line are also connected between the cable heater 45 and the electrical control 75. The thermocouple sends signals to the electrical control 75, as depicted in FIG. 2, which are correlated to the temperature of mixer 40 and are used to control the operation of cable heater 45.

A chemical reaction occurs between the two polymeric materials in the course of passage through the mixer 20, and continues after the components are dispensed from the outlet 42 thereof. In many applications, one component of the two-component system is a hardener which, when combined with the other component, causes that component to acquire its desired properties.

Each back pressure control means 22, 24 includes a bypass flow path 46, 48 around the gear pump 16, 18 with which it is associated. This bypass flow path comprises a flow conduit extending from the discharge side of the gear pump and its conduit 30, 34 to the input side of the gear pump and its input conduit 26, 28. Included in this flow path is a pneumatically operated flow control valve 52, 52', connected to the electrical control by lines 53 and 55, and an adjustable pressure regulator means 54, 54' connected in series in the bypass flow path. The adjustable pressure regulator means may take the form of a simple adjustable needle valve forming an adjustable restrictor in the bypass flow path 46, 48 or it may take the form of an adjustable pressure regulator valve. As explained more fully hereinafter, the function of this adjustable pressure regulator means 54, 54' is to regulate and control the back pressure in the bypass flow path 46, 48 when the flow control valves 52, 52' are open.

Additionally, each bypass flow path 46, 48 includes an overload pressure regulator in the form of a pressure relief valve 56, 56' connected in parallel with the flow control valve 52, 52' and adjustable pressure control means 54, 54'. The function of the overload pressure relief valve 56, 56' is to bypass liquid from the discharge side of the metering pump to the inlet side in the event that the pressure on the discharge side of the metering pump exceeds a preset pressure substantially above the operating pressure at which the particular component is to be supplied from the applicator 12 or 14 to the dispenser 20.

Air pressure is supplied alternatively to the air-pressure operated solenoids 32, 36 of the dispenser 20 and the pneumatically operated flow control valves 52, 52' of the back pressure control means 22 and 24 as determined by electrical control 75. That is, when air pressure is supplied to the solenoids 32, 34 of the dispenser via lines 33 and 37 so as to cause those valves to open and permit flow of liquid to the dispenser, air pressure is supplied via lines 53 and 55 to the flow control valves 52, 52' to close the bypass flow paths. On the other hand, when the solenoids 32, 36 are closed, and flow of valves 52, 52' are opened.

In the operation of the system 10 illustrated in FIG. 1, the first or smaller volume component polymeric material is supplied in solid form to the hot melt applicator 12. In this example, this component is referred to as the smaller volume component, or component "A", but it could obviously be supplied at the same volume as the second component and still be within the practice of this invention. In the applicator 12, this material is melted and converted from the solid to the liquid state. This liquid smaller volume component A is supplied via a pump contained in the applicator 12 under pressure to the metering pump 16. The metering pump is operative to supply the molten liquid component A at a desired flow rate to the discharge side of the metering pump. Assuming that the flow control valve 32 of the dispenser 20 is closed, the output flow from the metering pump 16 is routed via the now open flow control valve 52 and pressure regulator means 54 in the bypass flow path 46, back to the input side of the gear pump 16. This bypass flow of component A will continue until the dispenser flow control valve 32 is opened. Similarly, the high volume or main component, component "B" solid material is melted by the bulk hot melt applicator 14 and is supplied under pressure from a pump contained internally of the bulk melter 14 to the metering pump 18. So long as the flow control valve 36 of the dispenser remains closed, material B continues to flow through the metering pump 18 and then through the bypass flow path 48, through the open flow control valve 52' and the pressure regulator means 54', back to the input side of the metering pump 18. When the flow control valves 32, 36 of the dispenser are opened, the flow control valves 52, 52' in the bypass flow paths around the metering pumps are simultaneously closed. Thereby, each component is permitted to flow from the metering pump via the conduits 30, 34 into the dispenser 20 and through the mixer 40 to the discharge orifice 42 of the dispenser.

Initial Pressure Control At Inlets To Mixer/Dispenser

In accordance with the practice of one embodiment of this invention, the pressure of the two components A and B at the input side of the dispenser 20 is in the steady state flow condition when the two components are being mixed and dispensed through the dispenser 20. When the flow control valves 32, 36 of the dispenser 20 are closed and the flow control valves 52, 52' are open, the pressure regulator means 54, 54' are adjusted so as to maintain the pressure at the inlets to the dispenser 20 at about the same pressure as was recorded by pressure transducer and/or pressure read-out gauges 60, 62 on the input sides of the dispenser 20 in the steady state flow condition, i.e., when the flow control valves 32, 36 of the dispenser were open and the flow control valves 52, 52' were closed.

In practice it is preferred that the pressure regulator means 54, 54' are automatically adjusted. When operated automatically, the adjustable pressure regulator means 54, 54' may be adjusted by utilizing a closed loop control circuit, including a computer or programmable controller as part of the electrical control 75, to manipulate the adjustment of the pressure regulator means 54, 54' so as to maintain the input pressure to the dispenser as a function of the pressure that prevailed during steady state flow immediately prior to the closing of the flow control valves 32, 34. Preferably, in such an automatic control, the steady state pressure is determined for each cycle and the valves 54, 54' adjusted accordingly. This can be accomplished by utilizing pressure transducers for the gauges 60, 62 to provide input signals via lines 61 and 63, respectively, to the electrical control 75. The pressure settings of the pressure regulator means 54, 54' may then be adjusted by the electrical control 75 acting on the pressure control means 54, 54' by signals transmitted via leads 72, 74.

Thus, the pressure reading at the pressure gauge or transducer 60 located at the inlet to the dispenser will be substantially equal to or a function of the steady state flow pressure when there is no material flowing through the dispenser.

Flow Rate Adjustment To Compensate For Temperature Variations

As mentioned hereinabove, it is important to maintain the mass ratio of two components of a two-component mixing and dispensing system in order to have the resulting mixed components have the desired properties. In the case of paint, this may be a color or a drying time, or in the case of an adhesive, this may be a desired adhesive property and cure time. Since mass is a function of volume and density, and since density is a function of temperature, the volume of materials supplied to the dispenser by the metering pumps 16 and 18 must be varied in accordance with the temperature of the components if a fixed mass ratio between the two-component materials is to be maintained.

For example, if the temperature of the material supplied by metering pump 16 changes in temperature by 30° C., and if this material has specific gravity to temperature properties that will result in a specific gravity change of 2.5%, then the control 75 will cause the variable speed motor 16a to vary the speed of the metering pump by that same 2.5% in order to maintain the same fixed total mass flow rate of materials dispensed from the dispenser 20.

To maintain the fixed mass flow rate through the pumps 16, 18, temperature measuring devices 64, 66, such as, for example, a thermocouple or an RTD, are provided for utilization in a closed loop control circuit. It is preferred that a temperature measuring device 64, 66 is located within each metering pump to provide an electrical signal indicative of the temperature of the liquid component material contained within the pump. The signals are furnished via leads 69, 71 to the electrical control 75 which may contain a computer or programmable controller. The electrical control 75 also includes drive controls 68 and 70, such as SCR drives, for controlling the speed of the motors 16a and 16b, via lines 77 and 79. In response to the temperature signals from lines 69, 71, the electrical control 75 provides signals to the respective drive control 68, 70 which, in turn, adjust the speed of motors 16a, 16b, accordingly.

Mixing of Components And Purging Cured Mixture From Dispenser

With reference to FIGS. 2 and 3, component A from the hot melt applicator 12 and component B from the hot melt applicator 14 flow through valves 32, 36, respectively, into the dispenser 20. As mentioned above, the internal mixing element 43 is operative to repeatedly divide and recombine the components A and B so that they are thoroughly mixed when they reach the discharge orifice 42. As shown in FIG. 3, when the static mixer 40 first begins operation, the intermixed components A and B flow through essentially clear, unobstructed flow paths 72 and 74 defined by the spiral-shaped, internal mixing element 43 of the static mixer 40. Over a period of time, and particularly where the system 10 is operated intermittently, components A and B chemically react with one another within the interior 49 of static mixer 40 and at least partially cure therein to form a mixture of increased viscosity. A method for periodically flushing or purging the partially cured mixture of components A and B from the mixer interior 49 to delay the onset of the formation of a layer of cured material 76 of the type shown in FIG. 4 is disclosed in U.S. patent application Ser. No. 07/640,043, which is briefly discussed below.

Preferably, the flushing or purging of the partially cured mixture of components A and B is accomplished as follows. The low volume flow from hot melt applicator 1 is first discontinued by either shutting off the gear pump 16 or bypassing flow from the conduit 30 by operation of the flow control valve 52 in the manner described above. Having cut off the flow of component A through conduit 30, the high volume flow of component B through conduit 34 is utilized to purge or flush the mixer interior 49. Flow of this component B into the static mixer 40 is accomplished as described above, except that such flow is preferably pulsed or intermittently interrupted such as by turning on and off the metering gear pump 18, or by alternately directing the flow of component B into the bypass flow path 48 instead of through conduit 34 as described above. In either case, the flow of component B through conduit 34 into the interior 49 of static mixer 40 is preferably allowed to proceed for a predetermined interval, such as about two seconds, and then is discontinued for a predetermined time interval such as about two seconds, so that a pulsed flow of component B is introduced into the mixer interior 49.

It has been found that the pulsed or intermittently interrupted flow of component B or other purging material into the mixer interior 49 effectively flushes away at least a portion of the mixture of components A and B residing within the mixer 40 which has partially cured. It is believed that the pulsed flow of component B into the mixer 40 has the effect of increasing the "effective viscosity" of such material, which, in turn, increases the shear force which the component B flushing material applies to the partially cured mixture within the mixer interior 49. After being injected into the static mixer 40 for a period of about two seconds, it is believed that the flushing material stops or at least slows down during the following two second period when the flow is discontinued. This slowing or stoppage of the movement of component B within the mixer interior 49 increases its effective viscosity. When a new pulse or flow of component B is then introduced into the mixer interior 49, the component B flushing material previously introduced into the mixer 40 is pushed forwardly, and, because of its high effective viscosity, imposes a comparatively high shear force on at least a portion of the partially cured mixture of components A and B in the mixer interior 49. The pulses of the component B flushing material are continued for a sufficient period of time to force at least a portion of the partially cured mixture of components A and B from the mixer interior 49 through the discharge outlet 42. For example, the above-described purging operation has been successfully conducted over a time period on the order of about 30 seconds, or until about one-tenth to one-eighth of a pound of component B has been flushed through the mixer 40. When the operation of system 10 is resumed, the mixer 40 is effectively cleared of at least some of the partially cured mixture of components A and B which had been building up therein.

It is recognized that even with the purging operation described above, wherein a pulsed flow of component B or other purging material is introduced into mixer 40, the inner surface of the mixer wall 41 and the surfaces of the internal mixing element 43 nevertheless eventually become covered with a layer of deposited material which is believed to be cured material 76, or possibly a combination of cured and uncured material. As viewed in FIG. 4, this phenomenon is analogous to arteriosclerosis in human arteries where a layer builds on the inner walls and restricts the flow of blood. In the system 10 herein, the mixture of components A and B cannot be prevented from curing within the static mixer 40 and it gradually begins to form the layer of deposited or cured material 76 on the internal walls of the mixer 40. As used herein, the term "walls" is meant to refer to both the inner surface of outer wall 41 and the surfaces of internal mixing element 43.

Once some of the deposited or cured material forms on the mixer walls, the mixture of components A and B which is subsequently introduced into the mixer 40 tends to continue to build up along the walls. This is because the velocity profile of the mixture within the flow passages 72, 74 is such that the material at the center of the passages 72, 74 has the highest velocity, while that portion along the walls has a velocity approaching zero which allows it to be deposited with the material already present on the mixer walls. As a result, the layer of cured material 76 gradually continues to increase in thickness until the flow passages 72 and 74 through the mixer interior 49 become so clogged and restricted that little flow can be obtained through the mixer 40 and/or the components A and B are ineffectively mixed together. This condition can be determined by sensing the pressure across the static mixer 40 with a pressure sensor 77 of any commercially available type.

When the condition of the interior 49 of the static mixer 40 is at a point such as illustrated in FIG. 4, and the pressure drop across the mixer 40 reaches a predetermined upper limit, the second aspect of the method of this invention is employed to remove the layer of cured material 76 from the mixer walls. Initially, the flow of both components A and B to the mixer 40 is discontinued either by shutting off metering pumps 16, 18 or recirculating their flow through bypass flow paths 46, 48, in the manner discussed above. The cable heater 45 or heating coil 49 is then energized to apply heat to the outer wall 41 of mixer 40. Preferably, the cable heater 45 or heating coil 49 is operated by the electrical control 75 at a temperature of components A and B, but less than their decomposition temperature. Because the outer wall 41 and internal mixer element 43 of the mixer 40 are preferably formed of stainless steel, or other suitable thermally conductive metallic material, the heat from cable heater 45 of heating coil 49 is quickly and efficiently transferred to all of the walls of the mixer 40.

The walls of mixer 40 therefore become heated much more quickly than the cured material 76 as a whole which is adhered thereto. This is because such walls are much more thermally conductive then the polymeric components A and B forming the layer of cured material 76. As a result, those portions of the layer of cured material 76 which contact the inner surface of outer wall 41 of the internal mixing element 43 of mixer 40 are quickly elevated to a relatively high temperature, whereas the inner portions of the layer of cured material 76 remain at a lower temperature. Having elevated the temperature of the portions of cured material 76 which contact the mixer walls, the shear strength of such material thereat decreases and this reduces the bond or force with which the layer of cured material 76 attaches to the mixer walls.

Once the desired temperature within the mixer is obtained for a period sufficient to reduce the shear strength or force of adherence of the layer of cured material 76 to the mixer walls, a flow of flushing or purging material is introduced into the mixer interior 49. Preferably, the flow of component B into the mixer 40 is resumed at high hydraulic pressure and at a normal application temperature to accomplish the flushing operation. The hydraulic pressure at which the component B enters the mixer 40 varies in accordance with the extent of the restriction of the flow passages 72 and 74 caused by the layer of cured material 76. The component B is introduced at a constant flow rate, e.g., about 10 pounds per hour, and when it initially enters mixer 40, the hydraulic pressure is relatively high, e.g., on the order of about 1800 psi. This pressure then decreases to levels on the order of about 200 psi as cured material exits the mixer 40, with component B being supplied at constant flow rate.

As viewed in FIGS. 5 and 6, the flow of flushing material such as component B is effective to first dislodge the layer of cured material 76 from the outer wall 41 and internal mixing element 43 of mixer 40. The layer of cured material 76 fails or breaks away at the mixer walls, instead of at another location along the thickness of such layer of cured material 76, because of the aforementioned reduction of shear strength of the layer of cured material 76 at the mixer walls. Additionally, the relatively low temperature component B has a high effective viscosity when introduced into the mixer 40 which maximizes the shear force which component B applies to the layer of cured material 76.

After the layer of cured material 76 is broken away from the mixer walls, the component B flushing material transmits the cured material 76 as a slug through the mixer 40 and out its discharge outlet 42. See FIG. 6. Upon completion of this flushing or purging operation, the temperature of the mixer 40 is allowed to return to a normal level and resumption of operation of the system 10 can then proceed.

System Adjustment to Account For Changes In Viscosity of Mixture

As mentioned above, a principal aspect of this invention is predicated upon the concept of adjusting the pressure at which components A and B are delivered to the dispenser 20 through lines 30 and 34, respectively, dependent on changes in viscosity of the mixture of components A and B as it cures within the dispenser 20. The cure rate of the mixture of components A and B within the dispenser 20 is dependent on three parameters, namely (1) the ratio of component A to component B; (2) the temperature to which the mixture is exposed within the dispenser 20; and, (3) the residence time of the mixture within the dispenser 20. In the presently preferred embodiment, the system 10 of this invention monitors each of the three parameters mentioned above, and the electrical control 75 is effective to adjust the "off" pressure within the system 10 dependent on such parameters. This "off" pressure is meant to refer to the pressure within lines 30 and 34 which carry components A and B, respectively. Variation of the pressure within lines 30 and 34, as described above, is obtained by the pressure control means 22 and 24, and, in particular, the adjustable pressure regulators 54 and 54'.

With reference to FIG. 8, a diagrammatic sequence of the pressure adjustment within system 10 is illustrated. As noted above, this pressure adjustment is intended to compensate for curing of the mixture within the dispenser 20 during periods when the mixture is not being dispensed. Such pressure adjustment is necessary because as the mixture cures within the dispenser 20, it increases in viscosity and therefore a greater force is required to discharge it from the dispenser 20 when dispensing is resumed. Such greater force is provided by increasing the pressure at which components A and B flow through lines 30, 34 so that the mixture is ejected from the dispenser 20 at the desired flow rate upon resumption of the dispensing operation.

The uppermost box in FIG. 8, labeled with reference number 80, is entitled "Adjust Off Pressure To Maintain Desired Flow Ratio At Dispenser Restart". This box 80 refers to the control sequence exhibited by the system 10 as described in detail above. Adjustment of the "off" pressure during this operation condition is accomplished by the pressure control means 22 and 24 and electrical control 75 as described above, i.e., the pressure regulators 54 and 54' are operated by the electrical control 75 to ensure that the pressure of components A and B at the dispenser 20 is equal to, or a function of, the steady state flow pressure. If a dispenser "on" signal is received during the off pressure adjustment sequence depicted in box 80, that signal is transmitted from box 82 through line 84 to initiate "constant flow mode" operation of the system 10 as depicted schematically by box 86 in FIG. 8. The term "constant flow mode" refers to normal operation of the dispenser 20 in production wherein either the dispenser 20 is open constantly, or turned on and off intermittently at short intervals so that curing of the mixture within dispenser 20 is insignificant.

If a dispenser on signal depicted in box 82 is not received, as schematically depicted by line 88, the electrical control 75 adjusts the off pressure within lines 30 and 34 carrying components A and B in order to compensate for curing of the mixture within dispenser 20. See box 90. In order to execute this adjustment sequence, the electrical control 75 monitors the three different parameters within the system 10 which affect curing of the mixture within dispenser 20, i.e., the ratio of components A and B supplied to dispenser 20, the temperature of the mixture within dispenser 20 and the residence time of the mixture within the dispenser 20.

The ratio of component A to component B is a function of the speed of the variable speed motors 16a and 18a utilized to drive the gears 16b, 18b of the gear pumps 16 and 18, respectively. As the speed of motors 16a, 18a increases, for example, the volume of components A and B introduced into lines 30 and 34 increases. The electrical control 75 sends a signal via lines 92 and 94 connected to variable speed motor 16a, 18a, respectively, for controlling the relative volume or ratio of components A and B being introduced to the mixer/dispenser 20.

As depicted in FIG. 1, the temperature of the mixture within dispenser 20 is monitored by a temperature sensor 96 connected by a line 98 to the electrical control 75. The temperature sensor 96 is effective to send a signal to electrical control 75 representative of the mixture temperature.

The last parameter which influences curing time of the mixture within dispenser 20 is residence time. In the presently preferred embodiment, residence time is measured by a timer (not shown) contained internally of the electrical control 75. This timer is activated when the dispenser 20 is first turned off, and measures the total time during which the mixture is present within dispenser 20 before the dispensing operation is resumed.

The electrical control 75 is effective to process the signals received from variable speed pump 16a, 18a, from the temperature sensor 96 and from its internal timer, and employ either a mathematical formula or an empirically or experimentally determined look-up table to determine the appropriate adjustment of the pressure within lines 30 and 34 carrying components A and B. Depending upon the sensed parameters, the electrical control 75 automatically adjusts pressure regulator 54 and/or 54' so that the pressure at which the components A and B are supplied through line 30 and 34 to the dispenser 20 increases sufficiently to force the mixture within dispenser 20 outwardly therefrom at the desired flow rate when the dispensing operation is resumed. For example, if the dispenser 20 is shut off for a period of three minutes, the mixture within dispenser 20 will undergo a mathematically calculable or empirically determinable amount of curing which, in turn, increases the viscosity of the mixture. If the dispenser 20 is then opened after this three minute period, the electrical control 75 has effectively adjusted the pressure regulators 54 and/or 54' to increase the pressure with which components A and B are directed through lines 30 and 34. This increased pressure within lines 30 and 34 exerts a greater force on the now higher viscosity mixture within dispenser 20, than during steady state operation, so that the mixture is forced out of the dispenser at a predetermined, desired flow rate substantially equivalent to the flow rate obtained before the dispensing operation was interrupted. This same type of adjustment is made by electrical control 75 in the event either of the other two parameters which affect curing of the mixture were also to change, i.e., the relative ratio of components A and B, or the temperature of dispenser 20.

As schematically depicted in FIG. 8, the above-mentioned adjustment of the "off" pressure within lines 30 and 34 produces a calculated or empirically determined pressure within lines 30 and 34 which must be exerted to obtain the desired flow rate. This adjustment pressure level is then compared with a predetermined, maximum pressure necessary for safe operation of the system 10 as depicted schematically in box 100. If the adjusted, "off" pressure is too high, as depicted by the line 102 entitled "Yes", the system 10 undergoes a purge operation depicted schematically by the box 104. In other words, if the pressure necessary to obtain the desired flow rate of the mixture within dispenser 20 is too high, the system 10 must undergo a purge operation prior to resumption of the dispensing operation. This purging operation can be accomplished in the manner described above and depicted in FIGS. 2-7, or, alternatively, the dispenser 20 can be physically removed from the system 10 and replaced by a new mixer/dispenser 20 before resumption of operation.

On the other hand, if the "off" pressure as adjusted by the electrical control 75 does not exceed the predetermined maximum level, schematically depicted by the line 106 labeled "no" in FIG. 8, the electrical control 75 waits for a dispenser "on" signal as schematically depicted in box 108. If no "on" signal is received, the operating sequence returns to block 82 as depicted by line 107 in FIG. 8. If the "on" signal is received, indicating resumption of the dispensing operation, the system enters the constant flow mode 86 described above. This constant flow mode continues until a dispenser off signal is received, which is depicted schematically by the box 110. The electrical control 75 then resets to the beginning of the sequence described above, as indicated by line 112 in FIG. 8, and operation proceeds as described above. If the dispenser remains on, as depicted by line 114, the constant flow mode of operation continues.

Accordingly, the diagrammatic flow chart shown in FIG. 8 illustrates the operation of electrical control 75 in controlling the system pressure to account for curing of the mixture within dispenser 20 during periods when the dispenser is shut off or in the event of a change in the other operating parameters of interest, i.e., temperature and component ratio. It should be understood that the effect of each of the three parameters discussed above on the rate of curing of the mixture will vary for different types of materials and different operating requirements. It is contemplated that an appropriate mathematical formula can be derived for each different type or class of two-component materials to account for the affect of each of the three parameters of interest. Alternatively, the effect of such parameters can be determined empirically and/or experimentally to generate a "look-up" table contained within the software of the electrical control 75 which is utilized to properly adjust the pressure within lines 30 and 32, as required.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mixing and dispensing system for mixing and dispensing at least two different polymeric materials which react chemically with one another when combined, said system comprising:

a dispenser having a plurality of liquid flow inlets and an outlet;

first and second pump means for supplying a different liquid polymeric material under pressure to each of said liquid flow inlets of said dispenser, the liquid polymeric materials being combined with one another within said dispenser to form a mixture;

control means for adjusting the pressure at which at least one of said liquid polymeric materials is supplied to said inlets of said dispenser, when the flow of said materials through said dispenser is terminated, as a function of a change in the viscosity of the mixture of said liquid materials within said dispenser, said control means including a bypass flow path around at least one of said first and second pump means and an adjustable pressure regulator means for regulating the pressure in said bypass flow path.

2. The apparatus of claim 1 in which said first pump means includes a first pumping unit adapted to connect to a source of one liquid polymeric material and to one of said inlets of said dispenser, and said second pump means includes a second pumping unit adapted to connect to a source of a different liquid polymeric material and to another one of said inlets of said dispenser.

3. The apparatus of claim 2 in which said
adjustable pressure regulator means is connected between at least one of said first and second pumping units and said dispenser, for regulating the pressure at which at least one of said liquid polymeric materials is supplied to said dispenser;
means for adjusting said pressure regulator means to very the pressure at which said at least one liquid polymeric material is supplied to said dispenser dependent on changes in the viscosity of the mixture formed within said dispenser.

4. The apparatus of claim 3 in which said means for adjusting said pressure regulator means includes at least one of the following:
(i) means for determining the length of time during which flow of said liquid polymeric materials through said dispenser is terminated;
(ii) means for sensing changes in temperature of said mixture within dispenser; and
(iii) means for determining the ratio of said liquid polymeric materials supplied to said dispenser.

5. The apparatus of claim 1 wherein said control means comprises:
a means for controlling the inlet pressure of each of said polymeric materials at said dispenser after the flow of materials through said dispenser is terminated so that said inlet pressures are a predetermined function of the pressure which was maintained at said dispenser when said materials were flowing through said dispenser.

6. The apparatus of claim 1 further comprising:
purge means, operatively connected to said control means, for purging the mixture of said liquid materials from said dispenser prior to resumption of flow of said liquid polymeric materials through said dispenser in the event the viscosity of the mixture exceeds a predetermined level.

7. The apparatus of claim 6 in which said purge means includes means for pulsing a flow of one of said liquid polymeric materials through said dispenser, while terminating the flow of the other liquid polymeric material, to force at least a partially cured mixture of such materials out of said dispenser.

8. The apparatus of claim 6 in which the mixture of liquid polymeric materials forms a cured layer along the internal walls of said dispenser, said purge means including means for heating said dispenser to reduce the shear strength with which said cured layer adheres to said internal walls, and means for introducing a flow of one of said liquid polymeric materials into said dispenser while terminating the flow of the other of said polymeric materials.

9. The apparatus of claim 6 in which said first pumping unit is adapted to connect to a source of one liquid polymeric material and to one of said inlets of said dispenser, and said second pumping unit is adapted to connect to a source of a different liquid polymeric material and to another one of said inlets of said dispenser.

10. The apparatus of claim 9 in which said
adjustable pressure regulator means is connected between at least one of said first and second pumping units and said dispenser, for regulating the pressure at which at least one of said liquid polymeric materials is supplied to said dispenser;
means for adjusting said pressure regulator means to vary the pressure at which said at least one liquid polymeric material is supplied to said dispenser dependent on changes in the viscosity of the mixture formed within said dispenser.

11. The apparatus of claim 10 in which said means for adjusting said pressure regulator means includes at least one of the following:
(i) means for determining the length of time during which flow of said liquid polymeric materials through said dispenser is terminated;
(ii) means for sensing changes in temperature of said mixture within dispenser; and
(iii) means for determining the ratio of said liquid polymeric materials supplied to said dispenser.

12. The method of mixing and dispensing at least two different polymeric materials which react chemically with one another when combined, comprising:
supplying different liquid polymeric materials, under pressure, from first and second pump means to a dispenser wherein said materials are combined to form a mixture which is emitted from the dispenser;
terminating the flow of the mixture from the dispenser;
adjusting the pressure at which at least one of the liquid polymeric materials is supplied to the dispenser, prior to resumption of the flow of the mixture from the dispenser, as a function of a change in viscosity of the mixture within the dispenser, said adjusting step performed via operation of an adjustable pressure regulator means adapted to regulate the pressure in a bypass flow path around at least one of said first and second pump means.

13. The method of claim 12 in which said step of adjusting the pressure comprises adjusting the pressure at which at least one of the liquid polymeric materials is supplied to the dispenser as a function of the time during which the mixture remains within the dispenser before flow of the mixture from the dispenser is resumed.

14. The method of claim 12 in which said step of adjusting the pressure comprises adjusting the pressure at which at least one of the liquid polymeric materials is supplied to the dispenser as a function of the ratio with which the liquid polymeric materials are supplied to the dispenser.

15. The method of claim 12 in which said step of adjusting the pressure comprises adjusting the pressure at which at least one of the liquid polymeric materials is supplied to the dispenser as a function of the temperature of the mixture within the dispenser.

16. A method of mixing and dispensing comprising the steps of:
a. intermittently dispensing a mixture of a first and second pressurized liquid polymeric material from an outlet of a dispenser, the first and second liquid polymeric materials supplied to the dispenser by first and second pump means, respectively;
b. determining a steady state inlet pressure for each liquid polymeric material supplied to the dispenser from said first and second pump means when said mixture is dispensing under steady state flow conditions;

c. determining and maintaining an off inlet pressure as a function of the respective steady state inlet pressures of each liquid polymeric material when said mixture is not being dispensed from the dispenser; and d. adjusting the off inlet pressure prior to resumption of the flow of the mixture from the dispenser, as a function of a change in viscosity of the mixture within the dispenser, said adjusting step performed via operation of an adjustable pressure regulator means adapted to regulate the pressure in a bypass flow path around at least one of said first and second pump means.

17. The method of claim 16 wherein the off inlet pressure of each liquid polymeric material of step (c) is substantially equal to the respective steady state inlet pressure or is a multiple thereof; and wherein said step of adjusting the off inlet pressure comprises adjusting the pressure at which at least one of the first and second liquid polymeric materials is supplied to the dispenser as a function of at least one of the following: (i) the time during which the mixture remains within the dispenser before flow of the mixture from the dispenser is resumed; (ii) the ratio with which the liquid polymeric materials are supplied to the dispenser; and (iii) the temperature of the mixture within the dispenser.

* * * * *

UNITED STATES PATENT AND TRADEMARK OFFICE
CERTIFICATE OF CORRECTION

PATENT NO. : 5,271,521
DATED : December 21, 1993
INVENTOR(S) : Jeffrey S. Noss et al.

It is certified that error appears in the above-indentified patent and that said Letters Patent is hereby corrected as shown below:

Column 6, Lines 62 and 63, "are closed, and flow of valves 52,52' are opened" should read --and flow of liquid to the dispenser is shut off, the flow control valves 52, 52' are opened--.

Column 9, Line 11, "applicator 1" should read --applicator 12--.

Signed and Sealed this

Thirty-first Day of October 1995

Attest:

BRUCE LEHMAN

*Attesting Officer*   Commissioner of Patents and Trademarks